United States Patent
Jyani et al.

(12)

(10) Patent No.: US 11,422,599 B2
(45) Date of Patent: Aug. 23, 2022

(54) SYSTEM AND METHOD FOR SOFT-START SCHEME TO CONTROL INRUSH CURRENT FOR VCONN IN USB-C INTERFACE

(71) Applicant: SILICONCH SYSTEMS PVT LTD, Karnataka (IN)

(72) Inventors: Ashok Kumar Jyani, Karnataka (IN); Satish Anand Verkila, Karnataka (IN); Shubham Paliwal, Uttar Pradesh (IN); Rakesh Kumar Polasa, Karnataka (IN)

(73) Assignee: SILICONCH SYSTEMS PVT LTD, Karnataka (IN)

( * ) Notice: Subject to any disclaimer, the term of this patent is extended or adjusted under 35 U.S.C. 154(b) by 233 days.

(21) Appl. No.: 16/915,857

(22) Filed: Jun. 29, 2020

(65) Prior Publication Data
US 2021/0303049 A1    Sep. 30, 2021

(30) Foreign Application Priority Data
Mar. 31, 2020  (IN) .............................. 202041014325

(51) Int. Cl.
G06F 1/26 (2006.01)
H02M 1/36 (2007.01)
H02M 3/07 (2006.01)

(52) U.S. Cl.
CPC .............. *G06F 1/266* (2013.01); *H02M 1/36* (2013.01); *H02M 3/07* (2013.01)

(58) Field of Classification Search
CPC ............ G06F 1/266; H02M 1/36; H02M 3/07
See application file for complete search history.

(56) References Cited

U.S. PATENT DOCUMENTS

| 5,945,870 A | * | 8/1999 | Chu | ....................... G11C 5/145 |
|---|---|---|---|---|
| | | | | 327/540 |
| 9,395,728 B2 | | 7/2016 | Chiu et al. | |

(Continued)

FOREIGN PATENT DOCUMENTS

JP    2017216813 A    12/2017

OTHER PUBLICATIONS

Universal Serial Bus Type-C Cable and Connector Specification Release 2.0, USB 3.0 Promoter Group, Aug. 2019 (373 pages).
(Continued)

*Primary Examiner* — Patrick C Chen
(74) *Attorney, Agent, or Firm* — Procopio, Cory, Hargreaves & Savitch LLP

(57) ABSTRACT

The present disclosure provides a system and method for soft start scheme to control inrush current for VCONN in USB-C interface. The system includes: a serial shift register having flip-flops and adapted to obtain clock with programmable clock divider, frequency of clock changes dynamically by programming programmable clock divider; a resistor DAC unit configured to increment voltage in step-wise manner; a pass gate switch comprising NMOS gate switch and a PMOS gate switch connected in parallel and operatively coupled to the resistor DAC unit and configured to control an input voltage to a VCONN charge pump, said input voltage being in incremental steps such that the VCONN charge pump pumps an output voltage; and a VCONN switch gate operatively coupled to the VCONN charge pump and configured to supply the output voltage in controlled, incremental steps, such that the output voltage is ramped slowly to control the inrush current.

17 Claims, 7 Drawing Sheets

(56) References Cited

U.S. PATENT DOCUMENTS

| | | | |
|---|---|---|---|
| 10,381,787 B1* | 8/2019 | Bodnaruk | H02H 3/202 |
| 2021/0240142 A1* | 8/2021 | Bang | G05B 11/42 |
| 2022/0085825 A1* | 3/2022 | Iwamoto | H03M 1/66 |

OTHER PUBLICATIONS

Universal Serial Bus Power Delivery Specification, Revision 3.0, Version 2.0, Aug. 29, 2019 (657 pages).

\* cited by examiner

SYSTEM AND METHOD FOR SOFT-START SCHEME TO CONTROL INRUSH CURRENT FOR VCONN IN USB-C INTERFACE

CROSS REFERENCE TO RELATED APPLICATIONS

This Paris Convention patent application claims benefit under 35 U.S.C. § 119 and claims priority to Indian Patent Application No. IN 202041014325, filed on Mar. 31, 2020, titled "SYSTEM AND METHOD FOR SOFT-START SCHEME TO CONTROL INRUSH CURRENT FOR VCONN IN USB-C INTERFACE", the content of which is incorporated herein in its entirety by reference for all purposes.

TECHNICAL FIELD

The present disclosure relates to soft start scheme for VCONN in universal serial bus (USB) interfaces. More particularly, the present disclosure relates to a system and method for providing the soft start scheme for VCONN of USB type-C interface to control the inrush current.

BACKGROUND

Background description includes information that can be useful in understanding the present invention. It is not an admission that any of the information provided herein is prior art or relevant to the presently claimed invention, or that any publication specifically or implicitly referenced is prior art.

A plurality of USB (Universal Serial Bus) connectors and related standards have been developed. Recently, a USB Type-C standard has been developed including multiple requirements for USB Type-C connectors and the operation of devices implementing USB Type-C connections. Once two USB Type-C devices have completed connection negotiations and are connected through a USB Type-C connection, one device will operate as a DFP (downward facing port) device while the other device will operate as a UFP (upward facing port) device. It is also noted that these roles can be swapped based upon additional communications between the two devices.

Efforts have been made in related art to provide soft start scheme. In the related art, there are implementations that provide a drive circuit for a charge pump circuit capable of easily changing a magnitude of an output voltage and a time waveform, and a charge pump circuit. The VCONN charge pump circuit includes a step-up part having combinations of multiple capacitors and multiple switches, stepping up and outputting an input voltage; a clock part that generates a clock signal CL; an address counterpart that changes an address AD in accordance with the clock signal CL; and a memory part that previously stores multiple binary signals for controlling the multiple switches for each address and outputs the multiple binary signals in accordance with the address AD provided from the address counterpart. Control signals S1-S4 corresponding to the binary signals are then inputted to control terminals of the switches. However, such related art implementations do not involve controlling of inrush current for VCONN of USB interface to provide soft start scheme for VCONN. Additionally, implementing such a related art implementation may require significant memory in order to store multiple control signals.

Another related art implementation involves a charge pump that includes a driving stage, for generating a driving signal corresponding to a driving capability; a charge pump circuit, for generating an output voltage according to the driving signal; a comparing circuit, having a first comparator for comparing the output voltage and a first reference voltage to generate a first comparing result; an overload detection circuit, for generating a detection result according to at least one of the first comparing result and the output voltage; and a driving capability control circuit, coupled between the overload detection circuit and the driving stage for controlling the driving capability corresponding to the driving signal according to the detection result. Such related art implementations do not involve digitally controlled soft start scheme for VCONN in USB interface, and does not involve ramping up of the output voltage. Further, the such art implementations requires that the output of the charge pump be monitored, and a feedback loop be incorporated, making the resulting implementation very complex.

Therefore, there is a need in the art to provide a system and method for providing digitally controlled soft start scheme for VCONN to ramp up output voltage slowly using digital control mechanism.

SUMMARY

In some embodiments, the numbers expressing quantities or dimensions of items, and so forth, used to describe and claim certain embodiments of the invention are to be understood as being modified in some instances by the term "about." Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

It is an object of the present disclosure to provide a system and method for providing digitally controlled soft start scheme for VCONN in USB-C interface.

It is an object of the present disclosure to provide a system and method for controlling inrush current for VCONN of USB type-C interface.

It is an object of the present disclosure to provide a system and method to ramp up output voltage slowly using a digital control in order to control inrush current for VCONN.

It is another object of the present disclosure to provide a system and method for controlling input voltage to charge pump and output voltage from charge pump to a VCONN switch.

The present disclosure relates to soft start scheme for VCONN in USB interfaces. More particularly, the present disclosure relates to a system and method for providing the soft start scheme for VCONN of USB type-C interface to control the inrush current.

This summary is provided to introduce simplified concepts of a system for time bound availability check of an entity, which are further described below in the detailed description. This summary is not intended to identify key or essential features of the claimed subject matter, nor is it intended for use in determining/limiting the scope of the claimed subject matter.

An aspect of the present disclosure pertains to a system for soft start scheme to control inrush current for VCONN in USB-C interface. The system includes: a serial shift register having one or more flip flops operatively connected to each other serially, the serial shift register is adapted to obtain a clock sequentially with a programmable clock divider, wherein frequency of the clock pertaining to the serial shift register changes dynamically by programming the programmable clock divider; a resistor digital to analogue conversion (DAC) unit that can be operatively coupled to the serial shift register and can be configured to, upon controlling by the serial shift register, increment voltage in a step wise manner; a pass gate switch comprising NMOS gate switch and a PMOS gate switch connected in parallel and operatively coupled to the resistor DAC unit and configured to control an input voltage to a VCONN charge pump, said input voltage being in incremental steps such that the VCONN charge pump pumps an output voltage, corresponding to the input voltage; and a VCONN switch gate operatively coupled to the VCONN charge pump and configured to supply the output voltage in controlled, incremental steps corresponding to the output voltage of the charge pump, such that the output voltage is ramped slowly to control the inrush current.

In an embodiment, the system can include one or more processors configured to initiate the soft start scheme on receipt of an instruction.

In another embodiment, the input voltage to the charge pump can be varied in a staircase configuration, wherein a time period of each increment of the input voltage can be varied by the programmable clock divider.

In another embodiment, the input voltage to the charge pump can be varied in a staircase configuration, wherein the unit step voltage of the input voltage can be varied by the programmable DAC unit.

In another embodiment, the programmable clock divider can include one or more clock divide-by-2 circuits that are arranged in series such that each clock divde-by-2 circuit can include a flip-flop.

In another embodiment, the NMOS gate switch is ON during soft start to provide the input voltage to the VCONN charge pump with a predetermined voltage less than a corresponding gate voltage. When the gate voltage reaches VDD voltage level, the gate voltage is bypassed by the PMOS gate switch and VDD voltage level is provided as input to the VCONN charge pump.

In another embodiment, the VCONN charge pump can be configured to receive sum of clock voltage and the input voltage such that the VCONN charge pump provides double of the input voltage.

In another embodiment, with every clock, the serial shift register can be incremented to enable increment of the resistor DAC unit, input voltage to the VCONN charge pump and output voltage from the VCONN charge pump.

In another embodiment, the VCONN charge pump can be operatively coupled to, using a 5V Vgs transistor switch scheme (i.e. VCONN switch selection scheme), gate of the VCONN switch on any of CC1 line and CC2 line to control rate of rise of the output voltage.

In another embodiment, the VCONN switch selection can be implemented using a resistor divider such that, when any of CC1 line and CC2 line is selected, the voltage at a corresponding gate of cc1/cc2 selection switch's PMOS is half the value of charge pump output voltage to enable VCONN switch on any of CC1 line and CC2 line without violating the safe operating area of selection switches.

In another embodiment, an NMOS switch is added in parallel to the PMOS switch of cc1/cc2 selection switch to facilitate passing of low voltage from charge pump to the gate of VCONN switch.

In another embodiment, an RC network can be operatively connected to output of the VCONN charge pump and the 5V Vgs transistor switch scheme such that the RC network is adapted to slow down ramp rate of the output voltage, and wherein an option is provided to bypass resistance of the output voltage either completely or partially.

In another embodiment, the system can include a digital control unit that can be configured to enable and disable the VCONN switch, as per predefined USB-C power delivery (PD) requirements, based on identification of connection and disconnection of USB-C interface respectively.

In another embodiment, the digital control unit can be configured to enable the VCONN when the USB type-C interface is attached in VCONN source role, and disable the VCONN upon disconnection, wherein the digital control unit enables or disables VCONN when VCONN swap occurs in a USB-PD protocol.

In another embodiment, the system can include a de-bouncing circuit that can be configured to detect connection and enable the VCONN based on voltage of CC line by enabling EN signal to the serial shift register.

In another embodiment, the digital control unit can be configured to, upon reception of a VCONN swap message, compare current VCONN enable state and change the VCONN enable state to either on or off based on whether the VCONN is enabled or disabled.

Another aspect of the present disclosure pertains to a method for soft start scheme to control inrush current for VCONN in USB-C interface. The method includes steps of: obtaining, using a serial shift register having one or more flip flops operatively connected to each other serially, a clock sequentially with a programmable clock divider, wherein frequency of the clock pertaining to the serial shift register changes dynamically by programming the programmable clock divider; incrementing, by a resistor digital to analogue conversion (DAC) unit, upon controlling by the serial shift register, voltage in a step wise manner; controlling, by a pass gate switch comprising an NMOS gate switch and a PMOS gate switch connected in parallel and operatively coupled to the resistor DAC unit and configured to control an input voltage to a VCONN charge pump, said input voltage being in incremental steps such that the VCONN charge pump pumps an output voltage, corresponding to the input voltage;

and supplying, using a VCONN switch gate operatively coupled to the VCONN charge pump, the output voltage in controlled, incremental steps corresponding to the output voltage of the charge pump, such that the output voltage is ramped slowly to control the inrush current.

Various objects, features, aspects and advantages of the inventive subject matter will become more apparent from the following detailed description of preferred embodiments, along with the accompanying drawing figures in which like numerals represent like components

BRIEF DESCRIPTION OF THE DRAWINGS

The diagrams are for illustration only, which thus is not a limitation of the present disclosure, and wherein.

DETAILED DESCRIPTION

Figure 1:
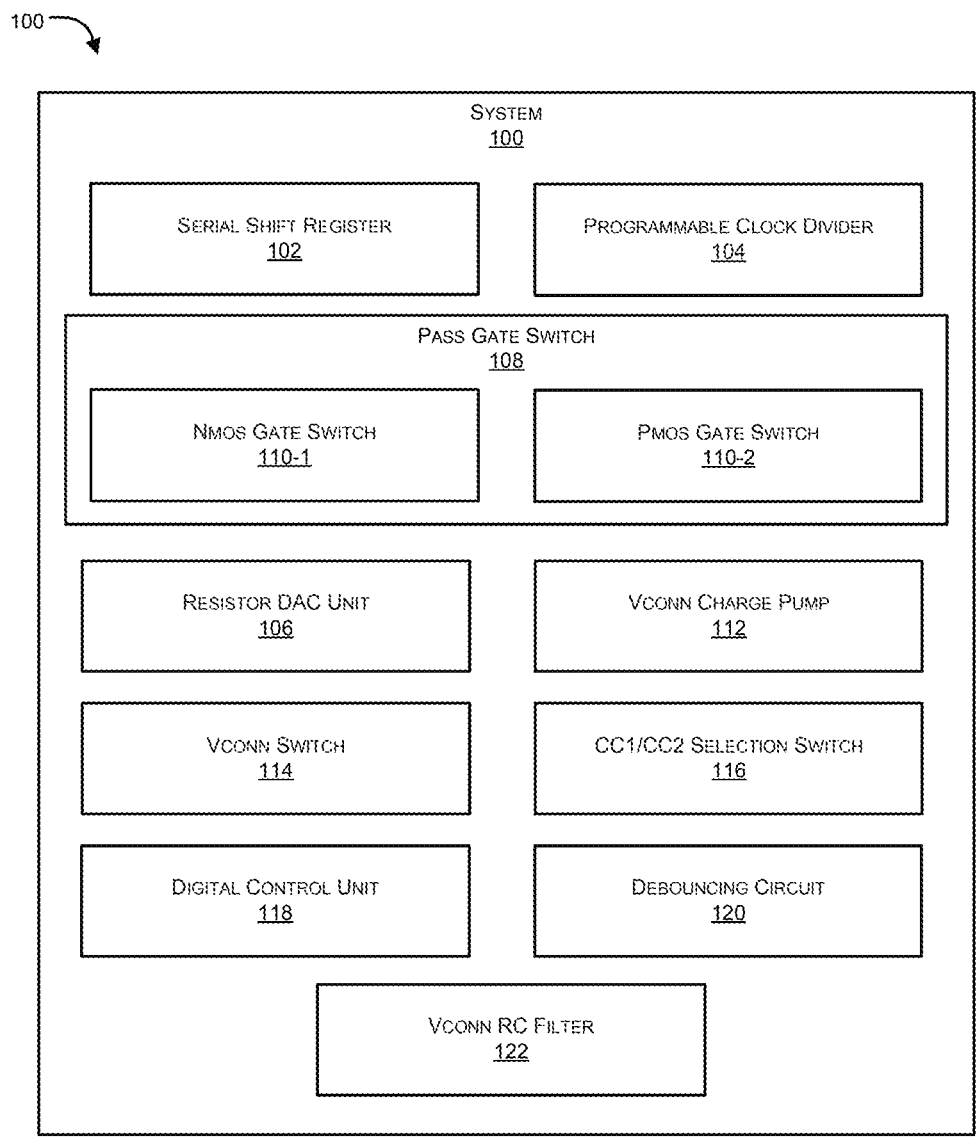
FIG. 1 illustrates an exemplary module diagram representation of a system for a soft start scheme to control inrush current for VCONN in USB-C interface, in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present disclosure. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware and/or by human operators.

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named element.

Embodiments of the present invention may be provided as a computer program product, which may include a machine-readable storage medium tangibly embodying thereon instructions, which may be used to program a computer (or other electronic devices) to perform a process. The term "machine-readable storage medium" or "computer-readable storage medium" includes, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). A machine-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases, it will be recognized that references to the "invention" will refer to subject matter recited in one or more, but not necessarily all, of the claims.

All methods described herein may be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing.

The present disclosure relates to soft start scheme for VCONN in USB interfaces. More particularly, the present disclosure relates to a system and method for providing the soft start scheme for VCONN of USB type-C interface to control the inrush current.

An aspect of the present disclosure pertains to a system for a soft start scheme to control inrush current for VCONN in USB-C interface. The system includes: a serial shift register having one or more flip flops operatively connected to each other serially, the serial shift register is adapted to obtain a clock sequentially with a programmable clock divider, wherein frequency of the clock pertaining to the serial shift register changes dynamically by programming the programmable clock divider; a resistor digital to analogue conversion (DAC) unit that can be operatively coupled to the serial shift register and can be configured to, upon controlling by the serial shift register, increment voltage in a step wise manner; a pass gate switch comprising NMOS gate switch and a PMOS gate switch connected in parallel and operatively coupled to the resistor DAC unit and configured to control an input voltage to a VCONN charge pump, said input voltage being in incremental steps such that the VCONN charge pump pumps an output voltage, corresponding to the input voltage; and a VCONN switch gate operatively coupled to the VCONN charge pump and configured to supply the output voltage in controlled, incremental steps corresponding to the output voltage of the charge pump, such that the output voltage is ramped slowly to control the inrush current.

In an embodiment, the system can include one or more processors configured to initiate the soft start scheme on receipt of an instruction.

In another embodiment, the input voltage to the charge pump can be varied in a staircase configuration, wherein a time period of each increment of the input voltage can be varied by the programmable clock divider.

In another embodiment, the input voltage to the charge pump can be varied in a staircase configuration, wherein the unit step voltage of the input voltage can be varied by the programmable DAC unit.

In an embodiment, the programmable clock divider can include one or more clock divide-by-2 circuits that are arranged in series such that each clock divde-by-2 circuit can include a flip-flop.

In another embodiment, the NMOS gate switch is ON during soft start to provide the input voltage to the VCONN charge pump with a predetermined voltage less than a corresponding gate voltage. When the gate voltage reaches VDD voltage level, the gate voltage is bypassed by the PMOS gate switch and VDD voltage level is provided as input to the VCONN charge pump. VCONN supply is derived from the VDD supply as defined by USB type C specifications (e.g., VDD=VCONN supply=3V to 5.5V).

In another embodiment, the VCONN charge pump can be configured to receive sum of clock voltage and the input voltage such that the VCONN charge pump provides double of the input voltage.

In another embodiment, with every clock, the serial shift register can be incremented to enable increment of the resistor DAC unit, input voltage to the VCONN charge pump and output voltage from the VCONN charge pump.

In another embodiment, the VCONN charge pump can be operatively coupled to, using a 5V Vgs transistor switch scheme (i.e. VCONN switch selection scheme), gate of the VCONN switch on any of CC1 line and CC2 line to control rate of rise of the output voltage.

In another embodiment, the VCONN switch selection can be implemented using a resistor divider such that when any of CC1 line and CC2 line is selected, the voltage at a corresponding gate of cc1/cc2 selection switch's PMOS is half the value of charge pump output voltage to enable VCONN switch on any of CC1 line and CC2 line without violating the safe operating area of selection switches.

In another embodiment, an NMOS switch is added in parallel to the PMOS switch of cc1/cc2 selection switch to facilitate passing of low voltage from charge pump to the gate of VCONN switch.

In another embodiment, an RC network can be operatively connected to output of the VCONN charge pump and the 5V Vgs transistor switch scheme such that the RC network is adapted to slow down ramp rate of the output voltage, and wherein an option is provided to bypass resistance of the output voltage either completely or partially.

In another embodiment, the system can include a digital control unit that can be configured to enable and disable the VCONN switch, as per predefined USB-C power delivery (PD) requirements, based on identification of connection and disconnection of USB-C interface respectively.

In another embodiment, the digital control unit can be configured to enable the VCONN when the USB type-C interface is attached in VCONN source role, and disable the VCONN upon disconnection, wherein the digital control unit enables or disables VCONN when VCONN swap occurs in a USB-PD protocol.

In another embodiment, the system can include a de-bouncing circuit that can be configured to detect connection and enable the VCONN based on voltage of CC line by enabling EN signal to the serial shift register.

In another embodiment, the digital control unit can be configured to, upon reception of a VCONN swap message, compare current VCONN enable state and change the VCONN enable state to either on or off based on whether the VCONN is enabled or disabled.

Another aspect of the present disclosure pertains to a method for a soft start scheme to control inrush current for VCONN in USB-C interface. The method includes steps of: obtaining, using a serial shift register having one or more flip flops operatively connected to each other serially, a clock sequentially with a programmable clock divider, wherein frequency of the clock pertaining to the serial shift register changes dynamically by programming the programmable clock divider; incrementing, by a resistor digital to analogue conversion (DAC) unit, upon controlling by the serial shift register, voltage in a step wise manner; controlling, by a pass gate switch comprising an NMOS gate switch and a PMOS gate switch connected in parallel and operatively coupled to the resistor DAC unit and configured to control an input voltage to a VCONN charge pump, said input voltage being in incremental steps such that the VCONN charge pump pumps an output voltage, corresponding to the input voltage; and supplying, using a VCONN switch gate operatively coupled to the VCONN charge pump, the output voltage in controlled, incremental steps corresponding to the output voltage of the charge pump, such that the output voltage is ramped slowly to control the inrush current.

FIG. 1 illustrates an exemplary module diagram representation of a system for a soft start scheme to control inrush current for VCONN in USB-C interface, in accordance with an embodiment of the present disclosure.

According to an embodiment, the system 100 can include one or more processor(s). The one or more processor(s) can be implemented as one or more microprocessors, microcomputers, microcontrollers, digital signal processors, central processing units, logic circuitries, and/or any devices that manipulate data based on operational instructions. Among other capabilities, the one or more processor(s) are configured to fetch and execute computer-readable instructions stored in a memory of the system 100. The memory can store one or more computer-readable instructions or routines, which can be fetched and executed to create or share the data units over a network service. The memory can include any non-transitory storage device including, for example, volatile memory such as RAM, or non-volatile memory such as EPROM, flash memory, and the like.

Various components/units of the proposed system 100 can be implemented as a combination of hardware and programming (for example, programmable instructions) to implement their one or more functionalities as elaborated further themselves or using processors. In examples described herein, such combinations of hardware and programming can be implemented in several different ways. For example, the programming for the units can be processor executable instructions stored on a non-transitory machine-readable storage medium and the hardware for units can include a processing resource (for example, one or more processors), to execute such instructions. In the present examples, the machine-readable storage medium can store instructions that, when executed by the processing resource, implements the various units. In such examples, the system 100 can include the machine-readable storage medium storing the instructions and the processing resource to execute the instructions, or the machine-readable storage medium can be separate but accessible to the system 100 and the processing resource. In other examples, the units can be implemented by electronic circuitry. A database can include data that is either stored or generated as a result of functionalities implemented by any of the other components/units of the proposed system 100.

In an embodiment, the system 100 for a soft start scheme to control inrush current for VCONN in USB-C interface is disclosed. The system 100 can include a serial shift register 102; a programmable clock divider 104; a resistor digital to analogue conversion (DAC) unit 106; at least a pass gate switch 108; a VCONN charge pump 112; a VCONN switch 114; a configuration line (CC1/CC2) selection switch 116; a digital control unit 118; a debouncing circuit 120; and VCONN RC filter 122. The serial shift register 102 can include one or more flip flops operatively connected to each other serially, and the serial shift register 102 can be adapted to obtain a clock sequentially with a programmable clock divider 104, wherein frequency of the clock pertaining to the serial shift register 102 changes dynamically by programming the programmable clock divider 104.

In an embodiment, the resistor DAC unit 106 can be operatively coupled to the serial shift register 102 and can be configured to, upon controlling by the serial shift register 102, increment voltage in a stepwise manner. The pass gate switch 108 can include: an NMOS gate switch 110-1 that can be operatively coupled to the resistor DAC unit 106 and can be configured to control an input voltage to the VCONN charge pump 112 during soft-start; and a PMOS gate switch 110-2 that can be operatively coupled, in parallel to the NMOS gate switch 110-1, to the resistor DAC unit 106 and configured to control the input voltage to the VCONN charge pump 112 after the soft start is done. The VCONN charge pump 112 pumps an output voltage, corresponding to the input voltage, to the VCONN switch 114.

In an embodiment, the VCONN switch 114 can be operatively coupled to the VCONN charge pump 112 through an RC network 122 and CC1/CC2 selection switch 116, and configured to supply the output voltage in a controlled manner such that the output voltage is ramped slowly to control the inrush current.

In an embodiment, the programmable clock divider 104 can include one or more clock divide-by-2 circuits arranged in series such that each clock divde-by-2 circuit can include a flip flop (for example, D-flip-flop) with its inverted output is directly connected to data input. For example, ten such circuits can be connected in series.

In an embodiment, the NMOS gate switch 110-1 allows the input voltage to the VCONN charge pump 112 with a predetermined voltage less than a corresponding gate voltage, and wherein when the gate voltage reaches VDD voltage level, then the gate voltage is bypassed by the PMOS gate switch 110-2 and VDD voltage level is provided as input to the VCONN charge pump 112.

In an exemplary embodiment, after each clock period, the resistor DAC unit 106 can increase its output voltage by one step.

In an exemplary embodiment, as NMOS gate switch 110-1 may not be good for passing a logic1, voltage provided by the NMOS gate switch 110-1 to VCONN charge pump 112 can be one Vt (can be threshold voltage) less than the gate voltage. Hence, in last step of soft start, when gate voltage is reached to VDD level, this switch is bypassed by the PMOS gate switch 110-2 and input of charge pump 112 can be connected to VDD.

In an embodiment, the VCONN charge pump 112 is configured to provide sum of clock voltage and the input voltage such that the VCONN charge pump 112 provides double of the input voltage.

In an embodiment, with every clock, the serial shift register 102 can be incremented to enable increment of the resistor DAC unit, input voltage to the VCONN charge pump 112 and output voltage from the VCONN charge pump 112.

In an embodiment, the VCONN charge pump 112 can be operatively coupled to, using a 5V Vgs transistor switch scheme, gate of the VCONN switch 114 on any desired CC line (CC1 or CC2) to control rate of rise of the output voltage.

In an embodiment, an RC network can be operatively connected to output of the VCONN charge pump 112 and the 5V Vgs transistor switch scheme such that the RC network can be adapted to slow down ramp rate of the output voltage, and wherein an option is provided to bypass resistance of the output voltage either completely or partially.

In an exemplary embodiment, there is need to switch in and out 10V without damaging 5V Vgs devices. This is more challenging since, during transition, the voltage slowly ramps up, so it should be properly on at low voltage as well as high voltage and during the transition. There is a requirement to ensure area is compact.

In an exemplary embodiment, an option to bypass the high resistance can be implemented by using a resistor division, so that when a PMOS resistor bypass switch is on, its gate can be at half the charge pump 112 output voltage. An output of charge pump 112 can go up to 10V. All switches used here are 20V devices, but they may not handle Vgs more than 5V.

In an embodiment, as mentioned-above, the system 100 can include the digital control unit 118 that can be configured to enable and disable the VCONN switch 114, as per predefined USB-C power delivery (PD) requirements, based on identification of connection and disconnection of USB-C interface respectively.

In an exemplary embodiment, VCONN switch selection scheme can also implemented by using a resistor division, so that the gate of the PMOS, used in cc1/cc2 selection switch, is at half the charge pump 112 output voltage when this PMOS switch is on, the CC1/CC2 selection switch 116 is protected from violating any safe operating area constraint. To ensure low voltage to be passed, the NMOS 110-1 can be added in parallel, but special care needs to be taken such that voltages do not exceed rated voltage. So, for this, delays and switching are appropriately added.

In an embodiment, the digital control unit 118 can be configured to enable the VCONN when the USB type-C interface is attached in VCONN source role, and disable the VCONN upon disconnection, and wherein the digital control unit enables or disables VCONN when VCONN swap occurs in a USB-PD protocol.

In an embodiment, as mentioned-above, the system 100 can include the debouncing circuit 120 that can be configured to detect connection and enable the VCONN based on voltage of CC line by enabling EN (enable) signal to the serial shift register 102.

In an exemplary embodiment, the digital control unit 118 can switch off VCONN on disconnection on indication from the debouncing circuit 120 by disabling the EN signal.

In an embodiment, the digital control unit 118 can be configured to, upon reception of a VCONN swap message, compare current VCONN enable state and change the VCONN enable state to either on or off based on whether the VCONN is enabled or disabled. In an exemplary embodiment, the digital control unit 118 can enable and disable VCONN as per USB-C PD requirements based on connection and detection respectively.

In an exemplary embodiment, time period of each incremental voltage step is programmable using the programmable clock divider 104. The voltage step can either be fixed or programmable (by changing unit step) such that number of steps required to reach from 0V to VDD can also change. Hence, an additional logic circuit can also be required to handle this functionality.

In an exemplary embodiment, instead of giving VDD directly to the input of the charge pump, a staircase input can be generated. In order to increase rise time of the staircase, there can be two methods. One method can be to increase time period of each step of staircase by using programmable clock divider 104. Another method can be to decrease unit step voltage value by using programmable resistor DAC unit 106.

In a first method, the unit step voltage can be fixed, hence the number of steps to reach from 0V to VDD is fixed. The clock frequency can be varied by using the programmable clock divider 104, which results in varying the time period of each step of the staircase.

In a second method, the unit step voltage can be made programmable by using a programmable resistor DAC. Based on the unit step voltage size, the number of steps to reach from 0V to VDD can change. If a small unit step voltage is implemented, then the number of steps required to reach from 0V to VDD will be more, and the staircase can take more time to rise. Additional logic circuit can be required to handle this functionality (not shown). A unit step voltage size can also be made different for each step, in order to get better slope.

In another embodiment, the first and second methods can be implemented in one circuit.

Although the proposed system 100 has been elaborated as above to include all the main units, it is conceivable that actual implementations are well within the scope of the present disclosure, which can include without any limitation, only a part of the proposed units or a combination of those or a division of those into sub-units in various combinations across multiple devices that can be operatively coupled with each other, including in the cloud. Further, the units can be configured in any sequence to achieve objectives elaborated. Also, it can be appreciated that proposed system 100 can be configured in a computing device or across a plurality of computing devices operatively connected with each other, wherein the computing devices can be any of a computer, a laptop, a smart phone, an Internet enabled mobile device and the like. Therefore, all possible modifications, implementations and embodiments of where and how the proposed system 100 is configured are well within the scope of the present disclosure.

Figure 2:
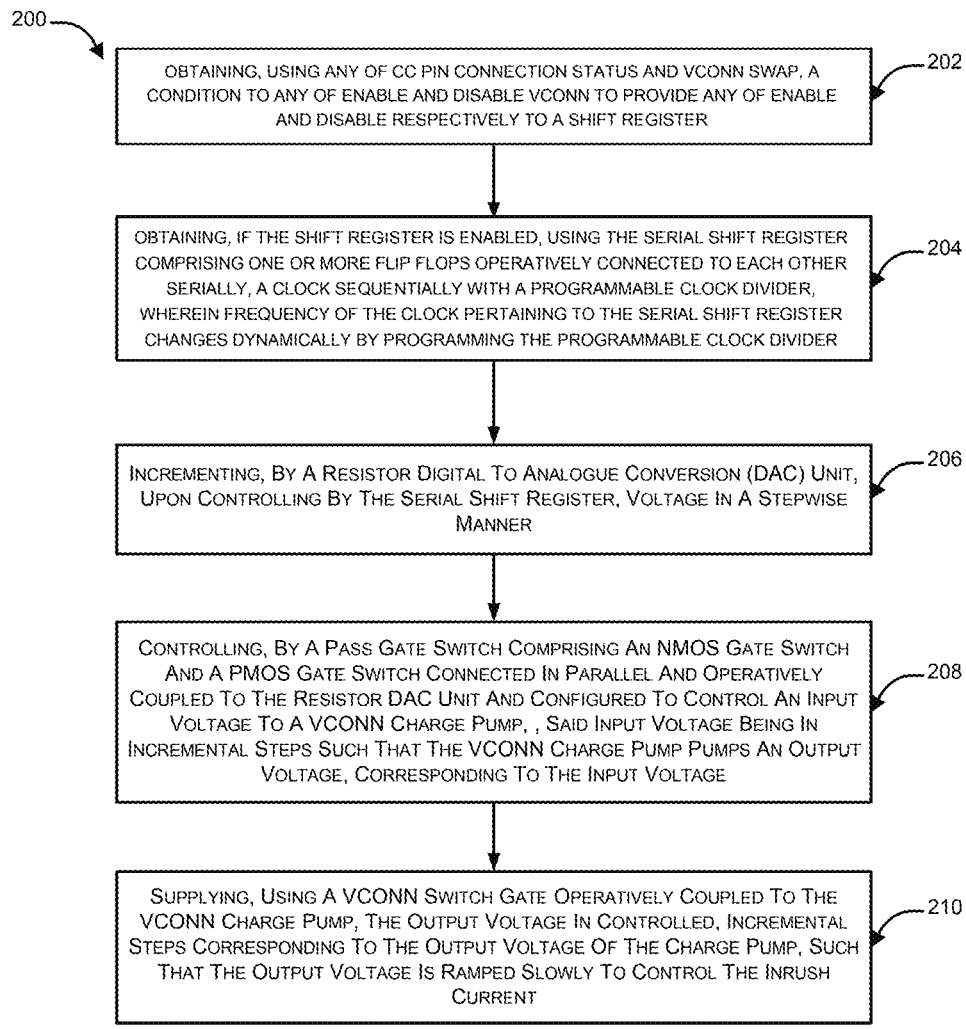
FIG. 2 illustrates an exemplary flow diagram representation of a method for a soft start scheme to control inrush current for VCONN in USB-C interface, in accordance with an embodiment of the present disclosure.

FIG. 2 illustrates an exemplary flow diagram representation of a method for a soft start scheme to control inrush current for VCONN in USB-C interface, in accordance with an embodiment of the present disclosure.

In an embodiment, the method 200 can include the steps of:
- 202—obtaining, using any of CC pin connection status and VCONN swap, a condition to any of enable and disable VCONN to provide any of enable and disable respectively to a shift register;
- 204—obtaining, if the shift register is enabled, using the serial shift register comprising one or more flip flops operatively connected to each other serially, a clock sequentially with a programmable clock divider, wherein frequency of the clock pertaining to the serial shift register changes dynamically by programming the programmable clock divider;
- 206—incrementing, by a resistor digital to analogue conversion (DAC) unit, upon controlling by the serial shift register, voltage in a stepwise manner;
- 208—controlling, by a pass gate switch comprising an NMOS gate switch and a PMOS gate switch connected in parallel and operatively coupled to the resistor DAC unit and configured to control an input voltage to a VCONN charge pump, said input voltage being in incremental steps such that the VCONN charge pump pumps an output voltage, corresponding to the input voltage; and
- 210—supplying, using a VCONN switch gate operatively coupled to the VCONN charge pump, the output voltage in controlled, incremental steps corresponding to the output voltage of the charge pump, such that the output voltage is ramped slowly to control the inrush current.

Figure 3:
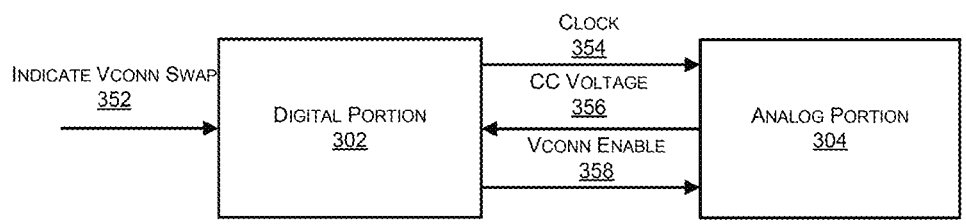
FIG. 3 illustrates an exemplary block diagram representation of digitally controlled soft start scheme for VCONN, in accordance with an embodiment of the present disclosure.

FIG. 3 illustrates an exemplary block diagram representation of digitally controlled soft start scheme for VCONN, in accordance with an embodiment of the present disclosure. As shown in FIG. 3, digital portion 302 is provided with an indicate VCONN swap (352) signal. Then, the digital portion 302 provides signals selected from any or a combination of clock signal (354), CC voltage signal (356) and VCONN enable signal (358) to an analogue portion (304).

Figure 4A:
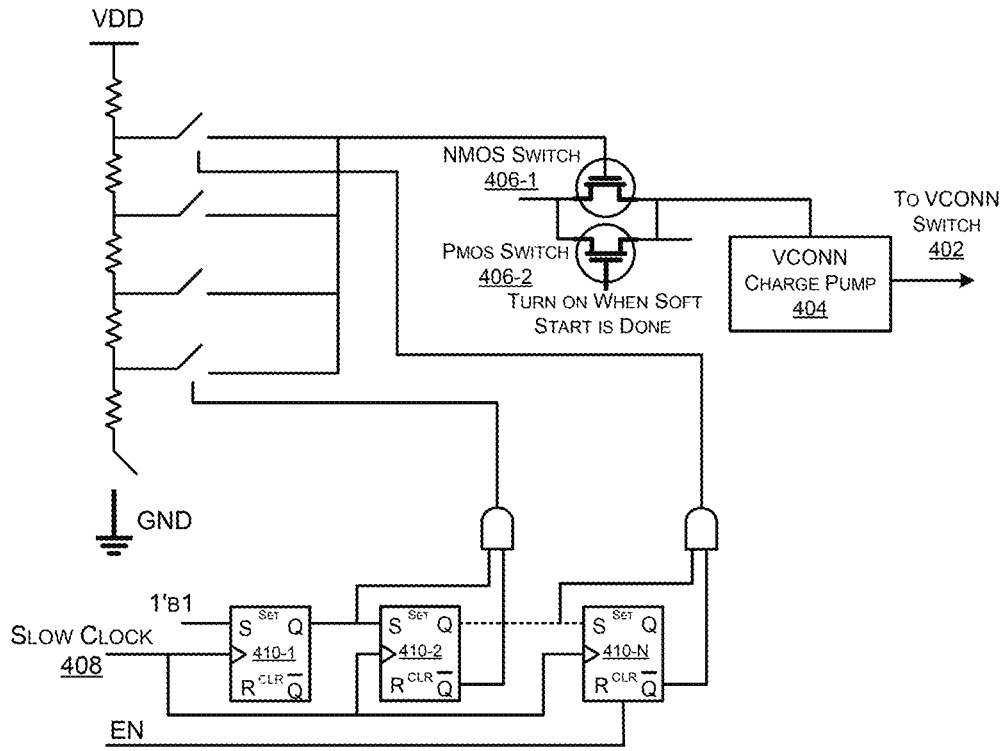
FIG. 4A illustrates an exemplary representation of an analogue block of FIG. 3 for providing soft start scheme, in accordance with an embodiment of the present disclosure.

FIG. 4A illustrates an exemplary representation of an analogue block of FIG. 3 for providing soft start scheme, in accordance with an embodiment of the present disclosure.

In an exemplary embodiment, there is a parasitic capacitance/capacitor at CC line. If VCONN supply is directly connected to CC line, there will be a high inrush current due to this capacitance, and it may damage the entire circuit in USB interface. In order to protect the circuit, output voltage at CC line is provided in a controlled manner such that it ramps up slowly. For example, the nominal clock frequency for this circuit can be 60 MHz, which can be programmed down or up to 60 MHz/1024 using a programmable clock divider. Using appropriate settings (clock division, RC filter, voltage step size), the gate voltage of VCONN switch can be made to ramp up slowly in the order of 1~2 ms time. Hence if supply voltage is 5V, then steady state output voltage of charge pump will be 9.87V. In this case ramp rate can be slowed down upto 9.87V/1 ms. The output voltage will also follow the almost same ramp rate.

In an exemplary embodiment, NMOS can be used as VCONN switch 402. A VCONN charge pump 404 is required to turn on VCONN switch 402. Two parallel switches (NMOS 406-1 and PMOS 406-2) can provide input voltages to the charge pump 404.

A clock (slow clock) 408 is provided to the shift register such that in each clock cycle (410-1, 410-2 . . . 410-$n$), one switch at corresponding resistor can be turned on and this is repeated sequentially. The voltage provided to gate of NMOS 406-1 can be increased continuously in each clock cycle. Voltage passed through this NMOS 406-1 to charge the input of the pump 404 will be one Vth less than its gate voltage. Hence, output voltage from the charge pump 404 is incremented dynamically after each clock cycle. Time taken to reach output voltage of the charge pump 404 can be a few milliseconds.

After a soft start, when gate voltage of NMOS 406-1 is maximum (i.e. VDD) and the same as the drain voltage, then the source voltage is one threshold voltage (Vt) less than the gate voltage and the output of the charge pump 404 may be less than 2*VDD. Therefore, there is a requirement to implement PMOS 406-2 switch in parallel with the NMOS 406-1 such that initially PMOS 406-2 is off. When a soft start is done, PMOS 406-2 is activated, then the input of charge pump is VDD. The output of the charge pump 404 is two times the input voltage to the charge pump 404. In order to slow down voltage to charge pump, a staircase input is utilized. This leads to a slow down of the output voltage of the charge pump 404 with a smooth ramping of the voltage. In an exemplary embodiment, the shift register can be programmable to select D-flip flops according to the requirements.

Figure 4B:
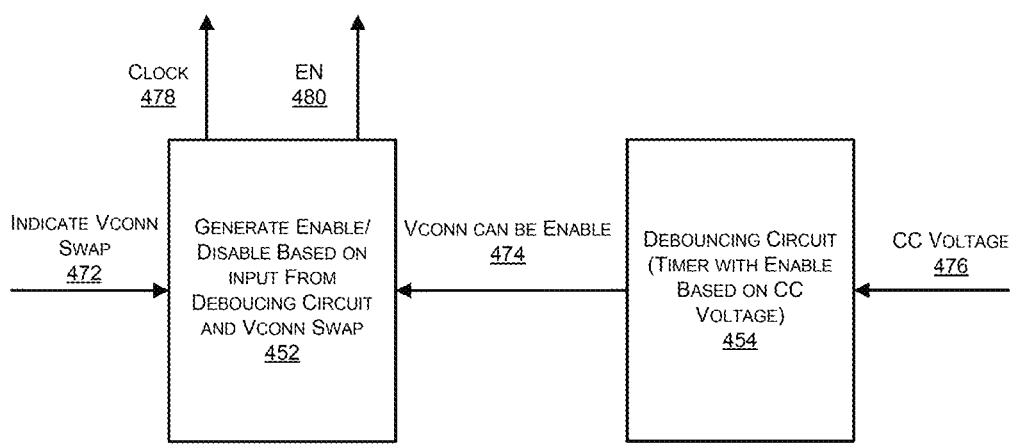
FIG. 4B illustrates an exemplary representation of digital block of FIG. 3, in accordance with an embodiment of the present disclosure.

FIG. 4B illustrates an exemplary representation of digital block of FIG. 3, in accordance with an embodiment of the present disclosure. Referring to FIG. 4B, indicate VCONN swap signal (472) can be provided to 'generate enable/disable based on inputs from debouncing circuit and VCONN swap' block 452. This block 452 receives input signal (474) (to enable VCONN) from debouncing circuit 454 (timer with enable based on CC voltage) that receives input from CC voltage (476). The 'generate enable/disable based on inputs from debouncing circuit and VCONN swap' block 452 can provide clock signal (478) and enable signals (480) as output.

Figure 5:
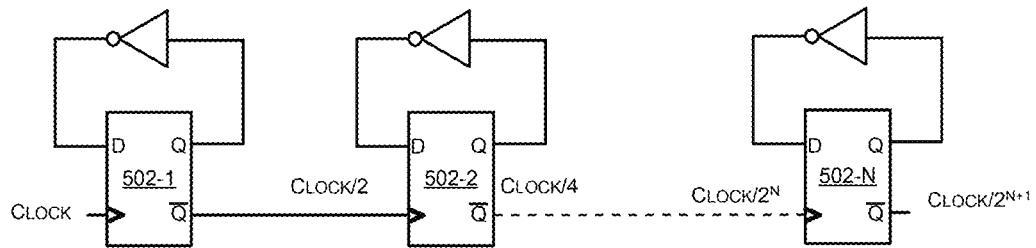
FIG. 5 illustrates an exemplary clock divider circuit diagram, in accordance with an embodiment of the present disclosure.

FIG. 5 illustrates an exemplary clock divider circuit diagram, in accordance with an embodiment of the present disclosure. There are N+1 D-flip flops (502-1, 502-2 . . . 502-N+1), which are implemented in order to divide clock frequency after each flip-flop. Finally, the flip-flop output clock frequency is divided by $2^{N+1}$.

Figure 6A:
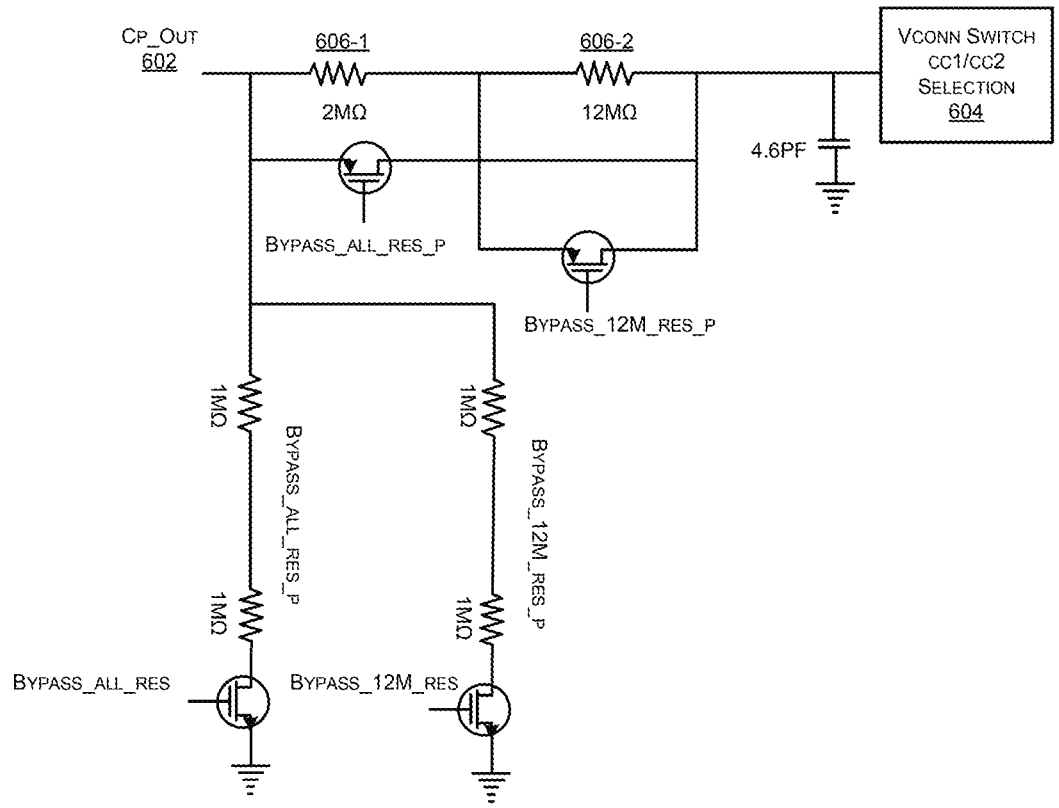
FIG. 6A illustrates an RC network to slow down ramp rate dynamically, in accordance with an embodiment of the present disclosure.

FIG. 6A illustrates an RC network to slow down ramp rate dynamically, in accordance with an embodiment of the present disclosure. The output voltage (602) from the charge pump is provided to RC network as shown in FIG. 6. The output of the RC network is operatively coupled to VCONN switch CC1/CC2 selection 604, wherein one VCONN switch is present at CC1 line and second VCONN switch is present at CC2 line. Resistors 2 MΩ 606-1 and 12MΩ 606-2 can be bypassed, but if a further slow down is required, then R can additionally be added in path in order to provide suitable output voltage to VCONN switch. If cp_out (output from charge pump) is high (around 10V) then bypass_all_res_p provided to P switch can be 5V. If cp-out is high and gate voltage is low, then the difference between source and gate is greater than 5V. This leads to switch damage. If the difference between source and gate of PMOS switch parallel to 2MΩ is less than 5V, then the output voltage is bypassed to VCONN switch.

In an exemplary embodiment, if bypass_all_res=1, then complete resistance will be bypassed irrespective of bypass_12M_res value. If bypass_all_res=0 and bypass_12M_res=1, then only 12MΩ resistance will be bypassed. Table 1 is given below for providing an example resistance bypass control.

TABLE 1

| bypass_all_res | bypass_12M_res | Resistance (M Ohm) |
|---|---|---|
| 0 | 0 | 14 |
| 0 | 1 | 2 |
| 1 | 0 | 0 |
| 1 | 1 | 0 |

Figure 6B:
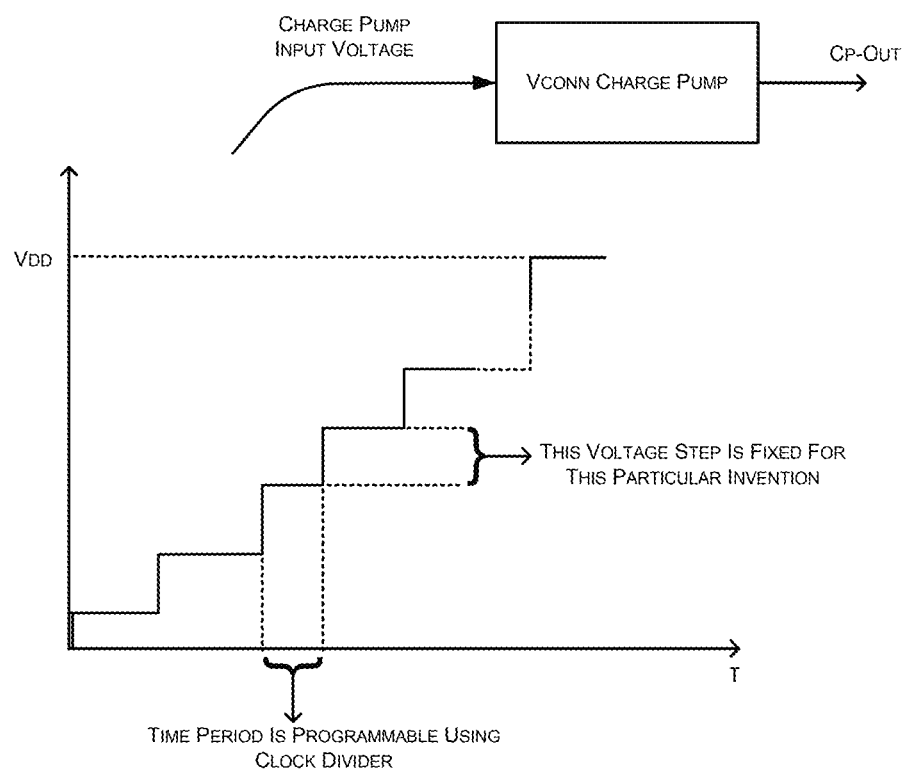
FIG. 6B illustrates an exemplary representation of slowing ramp rate dynamically, in accordance with an embodiment of the present disclosure.

FIG. 6B illustrates an exemplary representation of slowing ramp rate dynamically, in accordance with an embodiment of the present disclosure.

In an embodiment, the voltage step can be programmable. On changing the voltage step, the number of steps required to reach from 0V to VDD will also accordingly change. An additional circuit can be incorporated to handle this logic in accordance with the desired implementation.

In another embodiment, time period can also be changed using a clock divider.

Figure 7:
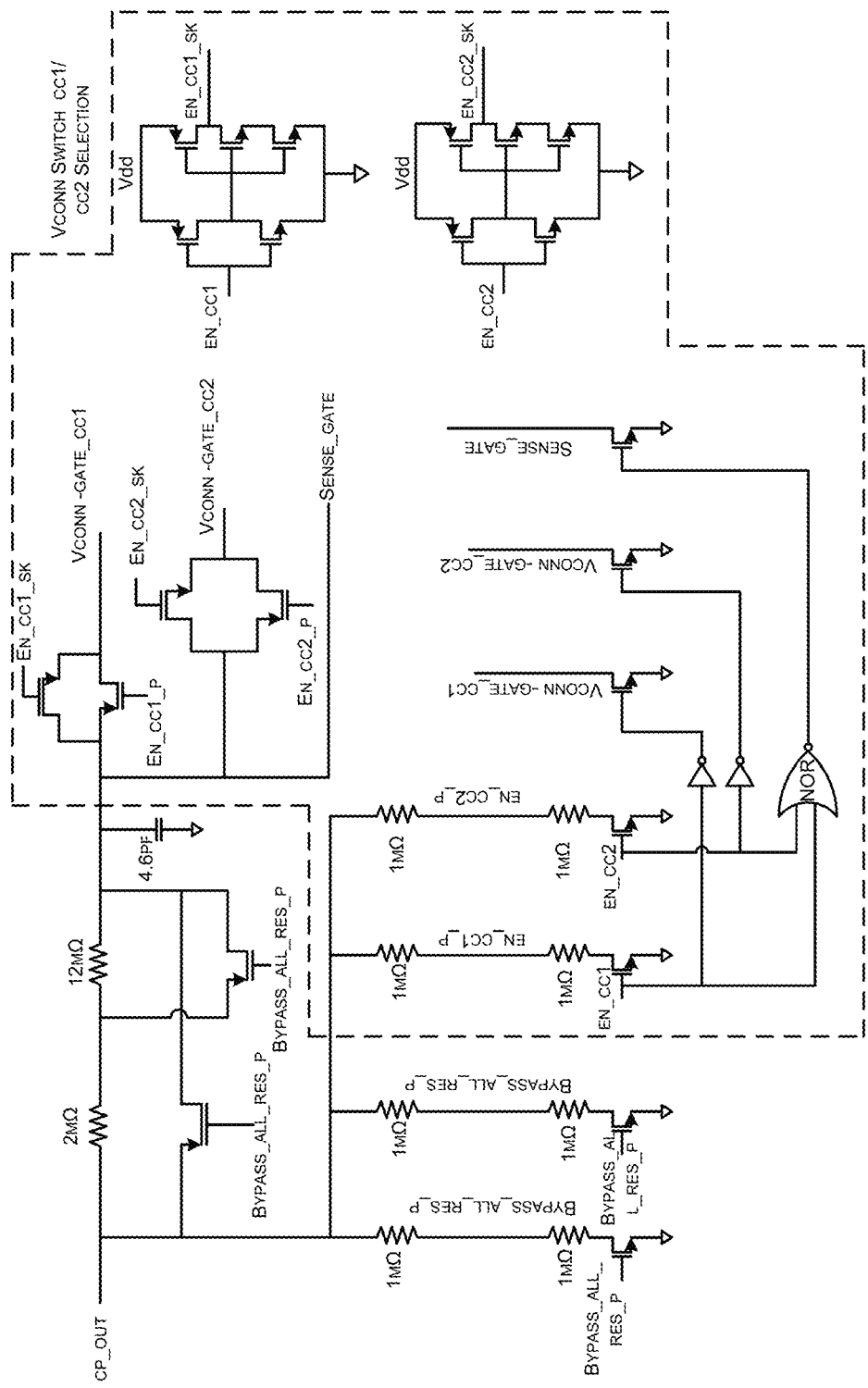
FIG. 7 illustrates the RC network of FIG. 6 with CC1/CC2 selection scheme, in accordance with an embodiment of the present disclosure.

FIG. 7 illustrates the RC network of FIG. 6 with CC1/CC2 selection scheme as described above, in accordance with an embodiment of the present disclosure. Hence, 0V to 10V signal is appropriately passed without loss to the signal and at the same time, no damage to the 5V vgs transistors being used is ensured.

Figure 8:
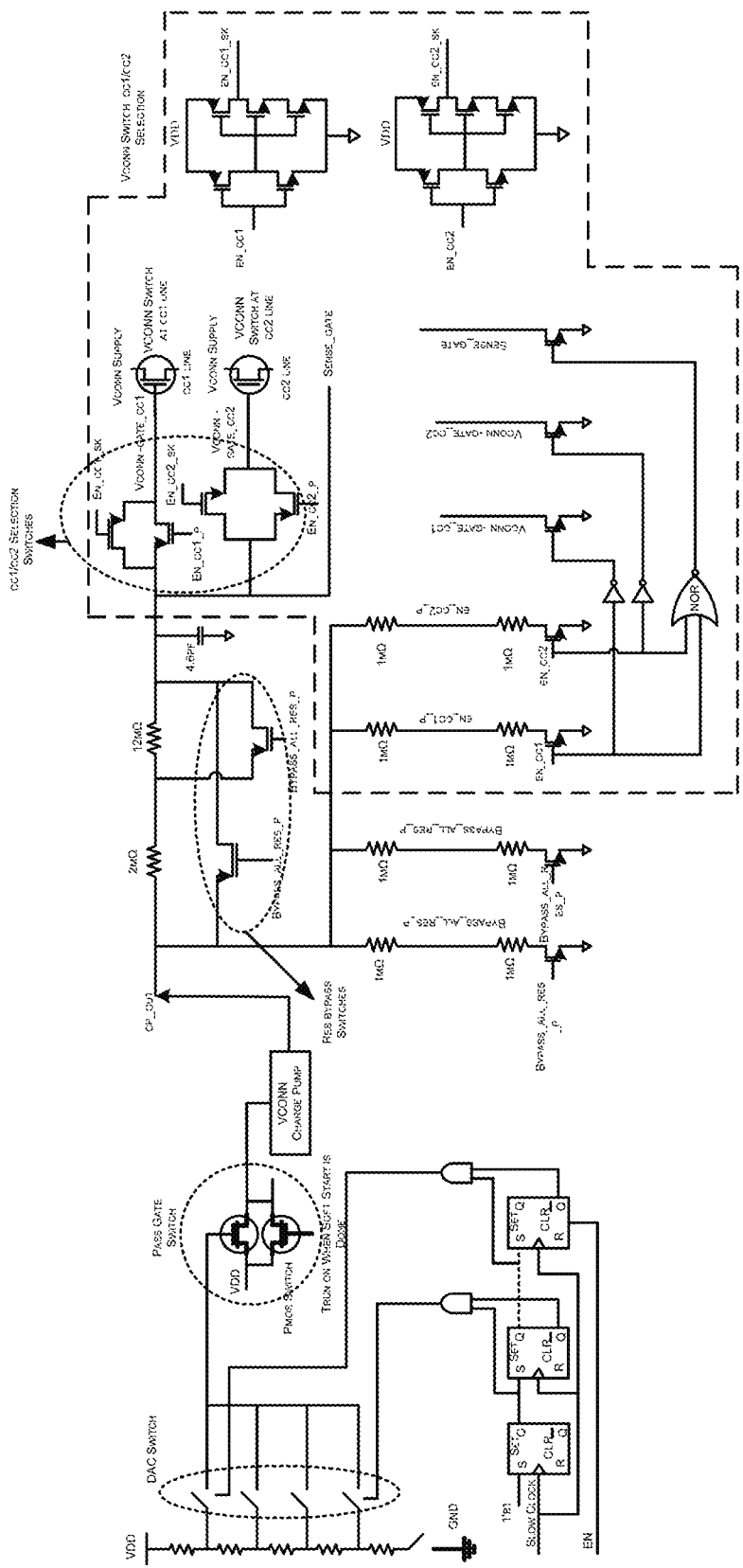
FIG. 8 illustrates an exemplary representation of the proposed soft-start scheme, in accordance with an embodiment of the present disclosure.

FIG. 8 illustrates an exemplary representation of the proposed soft-start scheme, in accordance with an embodiment of the present disclosure. Specifically, FIG. 8 is a top level integration of individual blocks as explained in the previous figures of the complete soft start scheme.

Thus, it will be appreciated by those of ordinary skill in the art that the diagrams, schematics, illustrations, and the like represent conceptual views or processes illustrating systems and methods embodying this invention. The functions of the various elements shown in the figures can be provided through the use of dedicated hardware as well as hardware capable of executing associated software. Similarly, any switches shown in the figures are conceptual only. Their function can be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

In the foregoing description, numerous details are set forth. It will be apparent, however, to one of ordinary skill in the art having the benefit of this disclosure, that the present invention can be practiced without these specific details. In some instances, well-known structures and devices are shown in block diagram form, rather than in detail, to avoid obscuring the present invention.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps can be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention can be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Through the embodiments described herein, the present disclosure provides a system and method for providing digitally controlled soft start scheme for VCONN in USB-C interface.

The present disclosure provides a system and method for controlling inrush current for VCONN of USB type-C interface.

The present disclosure provides a system and method to ramp up output voltage slowly using a digital control in order to control inrush current for VCONN.

The present disclosure provides a system and method for controlling input voltage to charge pump and output voltage from charge pump to a VCONN switch.

What is claimed is:

1. A system for a soft start scheme to control inrush current for VCONN in a USB-C interface, the system comprising:
    a serial shift register comprising one or more flip flops operatively connected to each other serially, and configured to obtain a clock sequentially with a programmable clock divider, wherein a frequency of the clock pertaining to the serial shift register changes dynamically through programming of the programmable clock divider;
    a resistor digital to analogue conversion (DAC) unit operatively coupled to the serial shift register and configured to, upon controlling by the serial shift register, increment voltage in a step wise manner;
    a pass gate switch comprising an NMOS gate switch and a PMOS gate switch connected in parallel and operatively coupled to the resistor DAC unit and configured to control an input voltage to a VCONN charge pump, said input voltage being in incremental steps such that the VCONN charge pump pumps an output voltage corresponding to the input voltage; and
    a VCONN switch gate operatively coupled to the VCONN charge pump and configured to supply the output voltage in controlled, incremental steps corresponding to the output voltage of the charge pump, such that the output voltage is ramped slowly to control the inrush current.

2. The system as claimed in claim 1, wherein the system comprises one or more processors configured to initiate the soft start scheme on receipt of an instruction.

3. The system as claimed in claim 1, wherein the input voltage to the charge pump is varied in a staircase configuration, and wherein a time period of each increment of the input voltage is varied by the programmable clock divider.

4. The system as claimed in claim 1, wherein the input voltage to the charge pump is varied in a staircase configuration, and wherein the unit step voltage of the input voltage is varied by the programmable DAC unit.

5. The system as claimed in claim 1, wherein the programmable clock divider comprises one or more clock divide-by-2 circuits arranged in series such that each clock divde-by-2 circuit comprises a flip-flop.

6. The system as claimed in claim 1, wherein the NMOS gate switch is ON during soft start to provide the input voltage to the VCONN charge pump with a predetermined voltage less than a corresponding gate voltage, and wherein when the gate voltage reaches VDD voltage level, then the gate voltage is bypassed by the PMOS gate switch and VDD voltage level is provided as input to the VCONN charge pump.

7. The system as claimed in claim 1, wherein the VCONN charge pump is configured to receive a sum of a clock voltage and the input voltage such that the VCONN charge pump provides double of the input voltage.

8. The system as claimed in claim 1, wherein with every clock, the serial shift register is incremented to enable increment of the resistor DAC unit, input voltage to the VCONN charge pump and output voltage from the VCONN charge pump.

9. The system as claimed in claim 1, wherein the VCONN charge pump is operatively coupled to, using a 5V Vgs transistor switch scheme, a gate of the VCONN switch on a first configuration line (CC1) and a second configuration line (CC2) to control rate of rise of the output voltage.

10. The system as claimed in claim 9, wherein the VCONN switch selection is implemented using a resistor divider such that, when any of the CC1 line and the CC2 line is selected, the voltage at a corresponding gate of a CC1/CC2 line selection switch's PMOS is half the value of charge pump output voltage to enable the VCONN switch on any of the CC1 line and the CC2 line without violating the safe operating area of selection switches.

11. The system as claimed in claim 10, wherein an NMOS switch is added in parallel to the PMOS switch of the cc1/cc2 line selection switch to facilitate passing of low voltage from charge pump to the gate of the VCONN switch.

12. The system as claimed in claim 9, wherein an RC network is operatively connected to output of the VCONN charge pump and the 5V Vgs transistor switch scheme such that the RC network is adapted to slow down ramp rate of the output voltage, and wherein an option is provided to bypass resistance of the output voltage either completely or partially.

13. The system as claimed in claim 1, wherein the system comprises a digital control unit configured to enable and disable the VCONN switch, as per predefined USB-C power delivery (PD) requirements, based on identification of connection and disconnection of USB-C interface respectively.

14. The system as claimed in claim 13, wherein the digital control unit attached in VCONN source role is configured to enable the VCONN when the USB type-C interface and disable the VCONN upon disconnection, and wherein the digital control unit enables or disables VCONN when VCONN swap occurs in a USB-PD protocol.

15. The system as claimed in claim 14, wherein the system comprises a debouncing circuit configured to detect connection and enable the VCONN based on voltage of CC line by enabling EN signal to the serial shift register.

16. The system as claimed in claim 13, wherein the digital control unit is configured to, upon reception of a VCONN swap message, compare current VCONN enable state and change the VCONN enable state to either on or off based on whether the VCONN is enabled or disabled.

17. A method for a soft start scheme to control inrush current for VCONN in USB-C interface, the method comprising steps of:
    obtaining, using a serial shift register comprising one or more flip flops operatively connected to each other serially, a clock sequentially with a programmable clock divider, wherein frequency of the clock pertaining to the serial shift register changes dynamically by programming the programmable clock divider;
    upon control by the serial shift register, incrementing voltage in a stepwise manner through use of a resistor digital to analogue conversion (DAC) unit;
    controlling, by a pass gate switch comprising an NMOS gate switch and a PMOS gate switch connected in parallel and operatively coupled to the resistor DAC unit and configured to control an input voltage to a VCONN charge pump, said input voltage being in incremental steps such that the VCONN charge pump pumps an output voltage, corresponding to the input voltage; and supplying, using a VCONN switch gate operatively coupled to the VCONN charge pump, the output voltage in controlled, incremental steps corresponding to the output voltage of the charge pump, such that the output voltage is ramped slowly to control the inrush current.

* * * * *